Patented Nov. 13, 1934

1,980,236

UNITED STATES PATENT OFFICE 1,980,236

PROCESS FOR MAKING AQUEOUS SOLUBLE COLLOIDAL SULPHUR ISOTONIC AND INJECTABLE SOLUTION PRODUCED THEREBY

John Torigian, Queens Village, N. Y., assignor to The Drug Products Co. Inc., Long Island City, N. Y., a corporation of New York No Drawing. Application November 3, 1933, Serial No. 696,598

5 Claims. (Cl. 167—72)

This invention relates to a novel therapeutic agent and a process for preparing the same. More particularly, it relates to a new and novel therapeutic agent which is capable of intravenous and intramuscular injection.

Sulphur, in its various allotropic forms, has been used for many years in the treatment of diseases. Externally, it has been used to cure or control various skin diseases by applying it, with a suitable base, as lotions, ointments, salves, powders, etc. Internally, as a laxative and otherwise, sulphur has been employed in the form of pills, tablets, capsules, and the like, or in liquid form with oils, molasses, etc. Its use for medicinal baths is also quite well known.

Until the advent of the present invention the use of sulphur for injection purposes has been quite limited. In an oil medium, such as olive oil, cottonseed oil, paraffin oil and the like, it has been used for intramuscular injections. However, various serious disadvantages have attended such injections since the insoluble forms of sulphur suspended in these oils frequently cause intense pain and discomfort, sometimes leading to the formation of nodules and other local irritations.

By this invention, sulphur injections are made entirely safe and are accompanied by none of the pain or local irritations heretofore experienced. This is made possible by the use of very finely dispersed colloidal sulphur in isotonic solution. This solution of colloidal sulphur, being isotonic, has the same osmotic pressure as normal blood, is therefore readily miscible therewith, and may be consequently injected intravenously without untoward reaction. Due to the enormous surface area of the fine particles of the colloidal sulphur and the ready miscibility of the solution with the blood stream, unusual penetrating power is attained, assuring greater and more certain therapeutic activity in a smaller dosage than the use of a larger amount of a non-colloidal suspension or solution.

For intramuscular and intravenous injections the new solution has also proved particularly efficacious, such injections being followed by no pain or local irritation.

The solution has been used clinically with great success in many stubborn cases of neuritis, arthritis, rheumatism, acne and other dermatologic affections. Its low toxicity has been demonstrated in the laboratory by experiments upon Albino rats. From 150 to 200 times the human dosage was administered without producing death. Double the average human dosage of one c. c., containing 10 mgm. of colloidal sulphur, employed clinically over an extended period of time, failed to produce any unfavorable symptoms.

The preferred method of preparing this new isotonic solution of colloidal sulphur is outlined in the following procedure, although it is to be distinctly understood that the invention is not limited thereto, the scope of the invention including any feasible method for preparing such an isotonic solution:

23.5 grams of sodium sulphide, c. p., are dissolved in 50 c. c. of double distilled, deaerated water. A solution of 10 grams of dextrine in 400 c. c. of double distilled, deaerated water is then added to the sodium sulphide solution, sulphurous acid solution is then added to the foregoing solution in small portions at a time until the critical point of precipitation is reached, and sufficient water added to make up 900 c. c. of the mixture. Any other feasible dispersing agent may be substituted for the dextrine. The resultant solution is then stirred and filtered.

At this stage, the pH of the solution is adjusted to a value of substantially 7.6, so that the solution is slightly alkaline. Under such conditions the colloidality of the solution is stabilized and the precipitation of sulphur prevented. It is also necessary that the solution be slightly alkaline in order to avoid proteolytic reaction and to make the solution more acceptable to the blood stream without irritation. A solution having a pH value lower than 7.0 would be acid and would result in the precipitation of sulphur, destruction of the colloidality of the solution and would be irritating when injected into the blood stream.

After the pH value has been carefully adjusted, a sufficient quantity of double distilled, deaerated water is added to make a solution of a desired concentration of sulphur or 1,000 c. c. The completed solution is then filtered through a filter having a porosity of about 100 microns, thus permitting the solution to pass through without affecting the colloidal property of the sulphur. Previously washed and sterilized ampuls of one c. c. size, or larger, are then promptly filled with the solution and the filled ampuls sealed and sterilized in an autoclave, thus increasing and preserving the colloidality of the sulphur.

On analysis, each one c. c. of the finished solution is found to contain 10 mgm. of finely dispersed colloidal sulphur, sulphides, sulphites, and thiosulphates which is considered to be the average human dose. Through the ultra-microscope the solution demonstrates active and prolonged Brownian movement.

By using the exact proportion of ingredients and by following the above procedure carefully, a stable isotonic solution is obtained. The solution is made isotonic due to the formation of certain quantities of salts formed during the reaction between the sodium sulphide and sulphurous acid solutions. If the particular quantities of ingredients as outlined in the above example are not employed it will be necessary to add inorganic salts, such as sodium chloride, to make the solution isotonic.

It is obvious that the invention comprehends any other reaction giving rise to a solution of colloidal sulphur. The essence of the invention, however, is to produce a colloidal solution of sulphur which is isotonic and which is therefore readily miscible with the blood stream.

The expression "autoisotonized" contained in the following claims is intended to mean that the solution is isotonized simultaneously with its preparation by the necessary reactions involved in the preparation of the colloidal sulphur, or, in other words, the solution is automatically isotonized.

I claim:

1. A new therapeutic agent for injection purposes comprising colloidal sulphur finely dispersed in a stable, transparent autoisotonized solution.

2. A new therapeutic agent for injection purposes comprising colloidal sulphur finely dispersed in a stable, transparent autoisotonized solution containing approximately 10 mgm. of sulphur for each c. c. of solution.

3. A new therapeutic agent for injection purposes comprising colloidal sulphur finely dispersed in a stable, transparent autoisotonized solution having a pH value of not less than 7.6.

4. A process for preparing an isotonic solution of colloidal sulphur for injection purposes comprising reacting, in the absence of other mineral acids, aqueous solutions of sodium sulphide and sulphurous acid in the presence of a dispersing medium and adjusting the pH of the resultant solution to a value of not less than 7.6.

5. A process for preparing an isotonic solution of colloidal sulphur for injection purposes comprising reacting, in the absence of other mineral acids, aqueous solutions of sodium sulphide and sulphurous acid in the presence of a dispersing medium, adjusting the pH of the resultant solution to a value of not less than 7.6 and passing the same through a filter having a porosity of about 100 microns.

JOHN TORIGIAN.